UNITED STATES PATENT OFFICE.

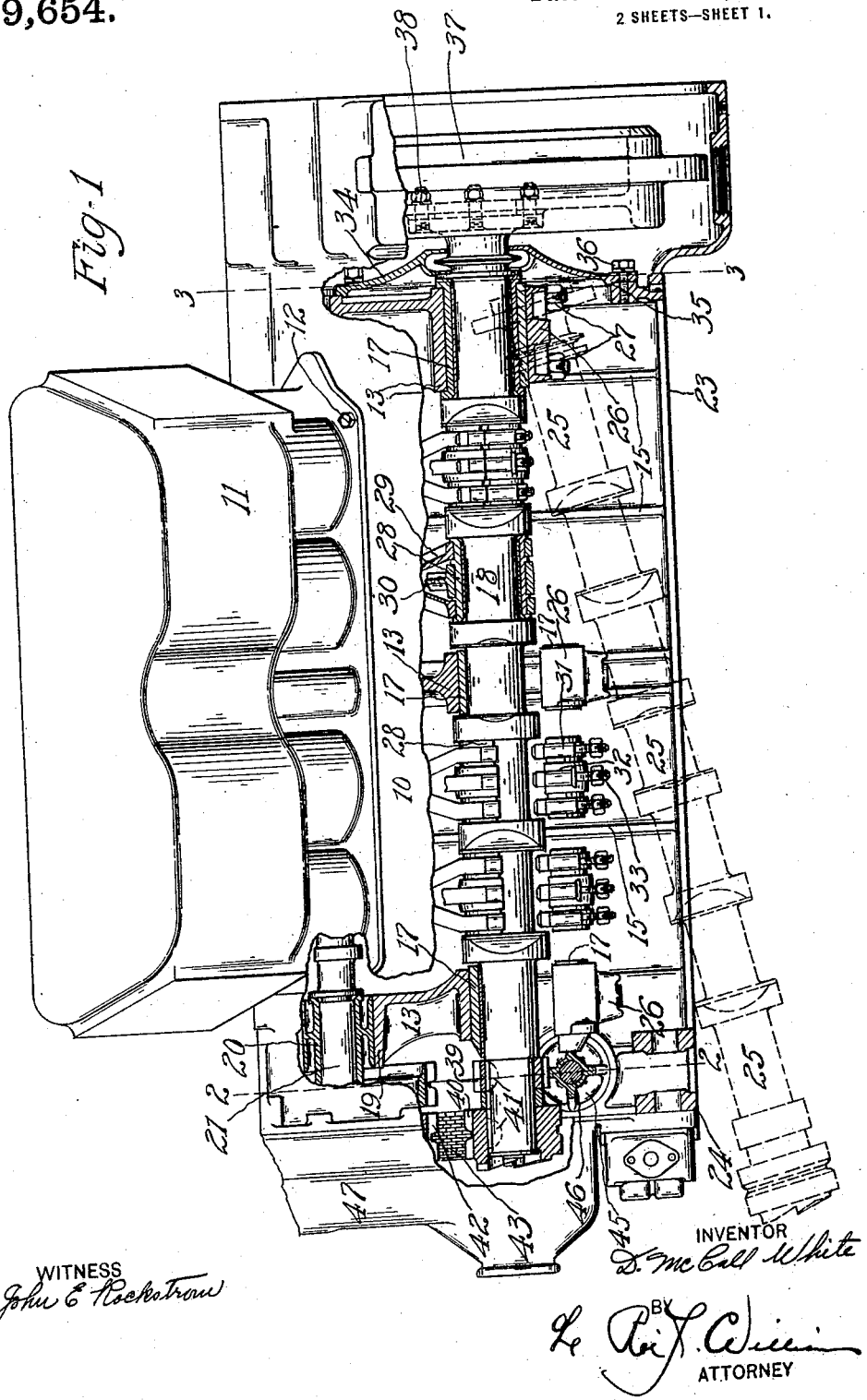

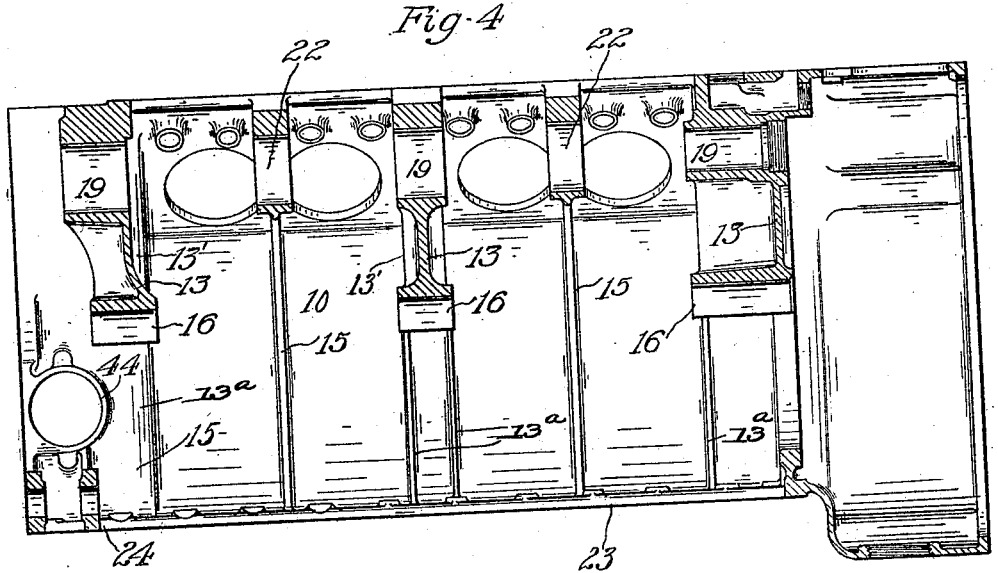
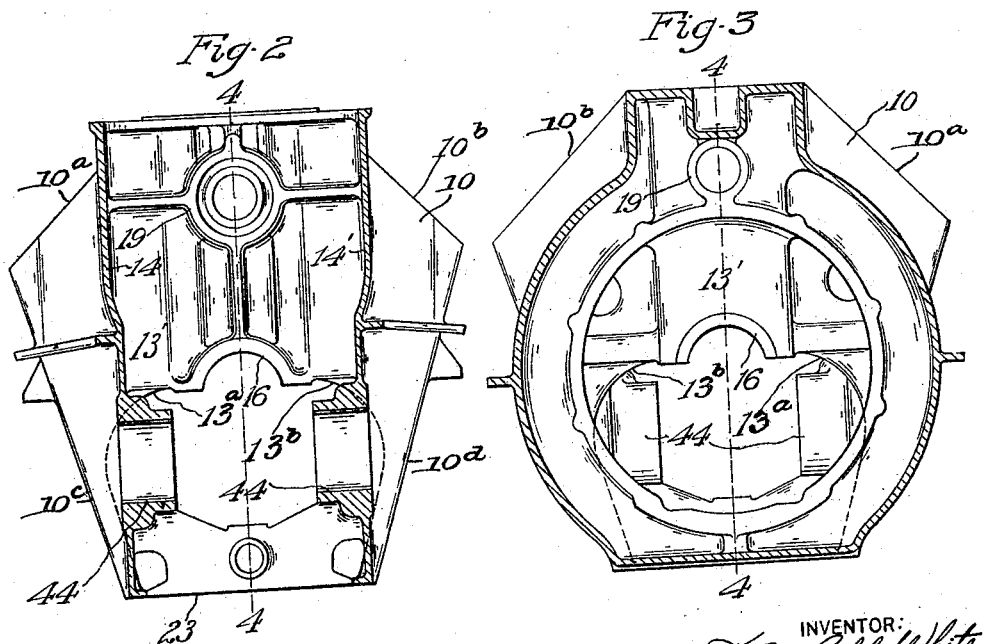

D'ORSAY McCALL WHITE, OF DETROIT, MICHIGAN, ASSIGNOR TO CADILLAC MOTOR CAR COMPANY, OF DETROIT, MICHIGAN, A CORPORATION OF MICHIGAN.

HYDROCARBON MOTOR.

1,419,654.

Specification of Letters Patent. Patented June 13, 1922.

Application filed December 4, 1915. Serial No. 64,960.

*To all whom it may concern:*

Be it known that I, D'ORSAY McCALL WHITE, a loyal subject of the King of England, and resident of Detroit, Wayne County, State of Michigan, have invented certain new and useful Improvements in Hydrocarbon Motors, of which the following is a specification.

This invention relates to hydrocarbon motors, and particularly to crank case constructions, which may be applied thereto.

One of the difficulties heretofore encountered in the design and construction of modern high speed multicylinder internal combustion engines, has been to produce a crank case embodying maximum strength for a given weight of materials, and at the same time possessing facilities which permit of easy machining of its various portions, as well as permitting a comparatively easy and inexpensive assembly and disassembly of its associateed parts, such as the crank shaft and crank shaft bearings.

A very generally used crank case for hydrocarbon motors is constructed of at least two main parts joined together in a horizontal plane, passing through the axis of the crank shaft. This construction, while permitting comparatively easy assembly and disassembly of the crank shaft and its associated parts, is expensive to machine because of its multiplicity of parts and is given to serious vibrations because of the necessarily inherent weakness arising out of the use of parts connected where the strains are very severe. This construction also makes it difficult, if not impossible, to brace and strengthen properly the bearing supports.

One of the objects of this invention is to provide a satisfactory one piece, or barrel crank case, particularly adapted for use in internal combustion engines of the multicylinder type.

Another object it to provide a novel and generally improved crank case structure for hydrocarbon motors.

Another object is to provide a single piece crank case of maximum strength for a given weight, which may be easily machined and its correlated parts assembled therein at a minimum expense.

These, and other objects, will appear from the following description, taken in connection with the accompanying drawings, which form a part of this specification, and in which:

Figure 1 is a side elevation of a power plant embodying this invention, with portions of the crank case and parts assembled therein, broken away, shown in elevation, or partly assembled for the sake of clearness. This view also illustrates in dotted lines a method of disassembling the crank shaft from the crank case;

Figure 2 is a transverse vertical section of a crank case, with other parts removed, substantially on the line 2—2 of Figure 1;

Figure 3 is a similar view, substantially on the line 3—3 of Figure 1; and

Figure 4 is a longitudinal vertical section through the crank case shown in Figures 1, 2 and 3, substantially on the lines 4—4 of Figures 2 and 3, respectively.

Referring to the drawings, 10 represents a single piece, or barrel crank case, on which may be suitably mounted, in V relation, a plurality of cylinder blocks, one of which 11, is shown as secured thereto, as by bolts 12. The crank case is provided with a plurality of integral bearing supporting members 13, which are provided with strengthening webs 13' extending across the crank case from one side wall 14 to the opposite wall 14'. The bearing supporting portions 13 are also ribbed or webbed at their opposite sides, as shown at 13ª and 13ᵇ, thus forming trusses for strengthening and bracing the entire case.

It will be noted that the bearing supporting portions 13 are provided at their lower ends with semispherical bosses 16, in which the bearing members 17 for a multi-throw crank shaft 18 may be arranged. There are also formed in the upper portions of the members 13, bosses 19, in which may be suitably arranged bearings 20 for a cam shaft 21. It will also be noted that arranged intermediate the bearing supporting members 19 are additional supports 22, for other bearings for the cam shaft 21. These supports are also formed integral with the crank case 10. The latter supporting members may also be provided with strengthening webs 15, serving as additional trusses or braces for the crank case; thus it will be seen, I have provided a barrel crank case which is trussed substantially around its entire circumference. As shown, the crank case comprises a pair of sloped cylinder supporting walls 10ᵃ and 10ᵇ and a pair of side walls 10ᶜ and 10ᵈ extending downwardly from the lower edges of said sloped walls. The said side walls extend below the crank shaft bearings to a slightly greater depth below the same than above the level of the bearings. Thus, it may be said that the crank shaft bearings are disposed substantially midway of the height of the side walls.

Having thus described the general arrangement and construction of the crank case, it will be understood that the crank shaft 18 may be assembled in the crank case 10 by inserting its rear end, through an opening 23 formed in the bottom of the crank case, to the position shown in dotted lines in Figure 1, and then carrying the crank shaft rearwardly, until the front end thereof, is rearwardly of the front edge 24 of the opening, when the crank shaft may then have its bearings 25 assembled in the supporting members 13 after the two part journal members 17 have been arranged in proper position, and the crank shaft and its bearings may then be held in proper relation by any suitable means, such as detachable caps 26, and bolts 27. The lower end connecting rod bearing members 28, and the forked and straight end connecting rods 29 and 30, respectively, may then be assembled in position and maintained in proper relation by suitable means, such as by detachable caps 31 and 32 and securing bolts 33.

A two-part cover 34 may be arranged over the opening 35 at the rear end of the crank case, and secured in position by means of bolts 36, after which a suitable fly wheel 37 may be secured to the rear end of the crank shaft, as by bolts 38. It will be noted that the front end of the crank shaft has arranged thereon a pair of gears 39 and 40, which may be secured in place, as by the keys 41, either before or after the crank shaft is assembled in position, as desired.

The cam shaft 21 may be provided with a gear 42, which may be driven from the crank shaft, by suitable means, such as a chain 43.

It will be also noted that formed in the crank case adjacent its front end are integral bearing members 44, in which may be arranged in suitable bearings 45, a transverse shaft 46, adapted to be driven by a gear, not shown, from the crank shaft 18, through the gear 39 arranged thereon. A suitable cover 47 may be provided to house the gears at the front end of the crank case; and another suitable cover, not shown, may be arranged over the lower opening 23 of the crank case.

The crank shaft may be disassembled from the crank case, by removing the various parts in the reverse order in which they were assembled, as described above; and after turning the crank shaft, which is illustrated as of an eight cylinder type having four throws, so that all of the throws are in a horizontal plane, the crank shaft may be dropped down so that the upper sides of the cranks are below the lowest part of the bearing supporting members 13, then the crank shaft may be moved rearwardly from the crank case through the opening 35. It will be understood this may be done without removing the fly wheel 37 or the gears 39 and 40 from the crank shaft, if desired; or if it is desired to remove the crank shaft through the bottom opening 23, the front end may be dropped down and the crank shaft swung out of the crank case in a direction reverse to that which it was directed when it was assembled in the crank case.

It is believed that it will be clearly understood from the foregoing description that I have provided a single piece barrel crank case, in which all of the bearing supporting members are formed integral with the crank case, and are also strengthened by trusses and webs, which results in a very sturdy and comparatively inexpensive structure; and it will also be noted that my crank case is provided with means permitting of different, comparatively easy and inexpensive methods of assembling and disassembling the crank shaft by this method, depending upon the conditions under which the parts should be changed.

It will also be clearly seen that as all of the crank shaft bearing supporting members are formed integral with the crank case, my construction permits of comparatively easy and inexpensive machining of the surfaces in which the bearings are adapted to be arranged.

While I have described and illustrated what I deem to be a preferred embodiment of my invention, it will be understood that the foregoing description, is illustrative only, as various modifications and changes may be made without departing from the spirit and scope hereof, as defined by the appended claims.

Having thus described my invention, what I claim and desire to secure by Letters Patent is:—

1. In a V type multicylinder hydrocarbon motor, a cylinder supporting crank case comprising a pair of sloped cylinder supporting walls and a pair of side walls integral with and extending downwardly from the lower edges of said sloped walls, and having bearings supported at intervals throughout the length thereof and substantially midway of the height of said side walls; and transversely extending webs extending between said side walls and portions of which webs depend below said bearings.

2. A V type hydrocarbon motor crank case structure comprising a pair of strain resisting side walls bridged at the top thereof by cylinder supporting walls, and having bearing members arranged substantially central of the structure and approximately at the level of the middle portions of said side walls, and at intervals throughout the length thereof; said crank case having also webs integral therewith and extending from said bearings to each of said side walls and to said bridge wall, and extending also below the level of said bearing members.

3. A V type hydrocarbon motor one piece crank case structure comprising a pair of sloped cylinder supporting top sections, a pair of inclined strain resisting side sections, and a plurality of transverse web members adapted to support bearings intermediate the height of said side sections; said side sections extending a greater depth below the level of said bearings than above said level.

In testimony whereof I affix my signature in the presence of two witnesses.

D. McCALL WHITE.

Witnesses:
DANIEL T. SMITH,
F. L. DAVIS.